United States Patent
Sakai et al.

[11] Patent Number: 6,142,906
[45] Date of Patent: Nov. 7, 2000

[54] HYDRAULIC PRESSURE CONTROL DEVICE OF AUTOMATIC TRANSMISSION

[75] Inventors: Hiromasa Sakai; Jun Sugihara, both of Yokosuka, Japan

[73] Assignee: Nissan Motor Co., Ltd., Yokohama, Japan

[21] Appl. No.: 09/521,610

[22] Filed: Mar. 9, 2000

Related U.S. Application Data

[62] Division of application No. 09/112,444, Jul. 9, 1998, Pat. No. 6,045,480.

[30] Foreign Application Priority Data

Jul. 9, 1997 [JP] Japan .................................. 9-183994

[51] Int. Cl.$^7$ .............................. F16H 57/04; F16H 15/38
[52] U.S. Cl. .................................. 476/8; 192/3.3; 476/42
[58] Field of Search .............................. 192/3.3; 476/8, 476/42

[56] References Cited

U.S. PATENT DOCUMENTS

| | | | |
|---|---|---|---|
| 4,880,091 | 11/1989 | Hasegawa et al. | 192/3.3 |
| 4,966,263 | 10/1990 | Hayasaki | 192/3.3 |
| 5,090,527 | 2/1992 | Imamura et al. | 192/3.29 |
| 5,136,890 | 8/1992 | Hibi et al. | 476/10 |
| 5,152,386 | 10/1992 | Imamura | 192/3.3 X |
| 5,163,540 | 11/1992 | Mainquist et al. | 192/3.3 |
| 5,219,055 | 6/1993 | Imamura | 192/3.3 X |
| 5,251,734 | 10/1993 | Benford et al. | 192/3.3 |
| 5,332,073 | 7/1994 | Iizuka | 192/3.3 |
| 5,722,519 | 3/1998 | Kirchhoffer et al. | 192/3.3 |

FOREIGN PATENT DOCUMENTS 4-78369  3/1992  Japan .

*Primary Examiner*—Allan D. Herrmann
*Attorney, Agent, or Firm*—Foley & Lardner

[57] ABSTRACT

A toroidal continuously variable transmission (11) having power rollers (18A–18D) held between input discs (19, 20) and output discs (21, 22) and transmitting power and a torque converter (12) having a lock up clutch (12D) connected to the continuously variable transmission (11) are provided. The line pressure of a working fluid supplied from a pump (1) is adjusted by a pressure regulator valve (2), and the adjusted line pressure is introduced to a lock up control valve (5) for controlling a fluid pressure to be supplied to the lock up clutch (12D) of the torque converter (12) through a pressure passage (31). Further, an oil cooler (32) is interposed in a downstream portion of the lock up control valve (5). The lubricating circuit of the continuously variable transmission is separated into a first lubricating circuit 33 for lubricating a bearing member of the power rollers (18A–18D) and a second lubricating circuit (35) for lubricating a rolling surface between the input and output discs (19–22) and the power rollers (18A–18D). The first lubricating circuit (33) is connected to a downstream portion of the cooler (32) and the second lubricating circuit (35) is connected to an upstream portion of the lock up control valve (5).

4 Claims, 5 Drawing Sheets

HYDRAULIC PRESSURE CONTROL DEVICE OF AUTOMATIC TRANSMISSION

This Application is a Divisional of application Ser. No. 09/112,444, filed on Jul. 9, 1998 now U.S. Pat. No. 6,045,480.

FIELD OF THE INVENTION

The present invention relates to a hydraulic pressure control device of an automatic transmission for a vehicle.

BACKGROUND OF THE INVENTION

Japanese Patent Publication Tokkai Hei 4-78369 discloses an automatic transmission for an automotive vehicle in which a torque converter with a lock up clutch, and a toroidal continuously variable transmission are combined.

In the automatic transmission, in order to control the speed change ratio of the continuously variable transmission and engage and release the lock up clutch, a pressurized fluid is supplied from a single hydraulic pump. The fluid functions as a lubricating fluid for each lubricating portion of the continuously variable transmission.

In the toroidal continuously variable transmission, a power roller is disposed between an input disc and an output disc, the rotation in accordance with a contact friction there between is transferred and the speed change ratio is varied in a continuous manner in accordance with the angle of the incline of the power roller. In order to transmit high torque, a great contact pressure is applied between the power roller and the disc. As a result it is necessary to cool and lubricate these members by the application of considerable amounts of lubricating fluid. In this case, the lubricating fluid for the power roller and the disc portion can be divided into two lines. One is a fluid supply to the contact surface therebetween and another is a fluid supply to a bearing portion of the power roller.

The lubricating fluid from the pump is supplied via a torque converter pressure circuit for operating the lock up clutch, and a fluid cooler for cooling a lubricating fluid itself is interposed in the middle thereof. Since a pressure loss is generated when the lubricating fluid passes through the oil cooler, a pump having a great capacity is required in order to secure a supply amount of the lubricating fluid to the power roller under an high power operating condition.

Particularly, since high temperature working fluid enters the torque converter, after passing through the lock up clutch which is in a releasing state the fluid temperature becomes too high. Therefore lubricating and cooling performance deteriorates. Furthermore the durability of the torque converter is deteriorated, when lubricating fluid is supplied without passing through the oil cooler.

SUMMARY OF THE INVENTION

An object of the present invention is to obtain good lubrication and cooling of a power transmitting element in a transmission without enlarging the capacity of a hydraulic pump.

Another object of the present invention is to supply a necessary and sufficient fluid amount even to a lock up clutch.

In order to achieve the above objects, the present invention provides a hydraulic pressure control device for use with an automatic transmission which comprises a toroidal continuously variable transmission having power rollers held between input discs and output discs which transmits power, the torque converter having a lock up clutch connected to the continuously variable transmission.

The device comprises a pressure regulator valve for adjusting the line pressure of working fluid supplied to the continuously variable transmission from a pump to a predetermined pressure, a pressure passage for introducing the adjusted line pressure to the lock up clutch through a lock up control valve, an oil cooler provided downstream of the lock up control valve. The working fluid through the cooler is supplied to the lubricating circuit of the continuously variable transmission.

The device further comprises that the lubricating circuit which is separated into a first lubricating circuit for lubricating a bearing member of the power rollers and a second lubricating circuit for lubricating a rolling surface between the input and output discs and the power rollers, the first lubricating circuit is connected downstream of the cooler and the second lubricating circuit is connected upstream of the lock up control valve.

It is preferable that the device also comprises an orifice which is provided in a passage through which the working fluid may flow and bypass the lock up control valve. The cooler is connected to a downstream portion of the orifice.

It is further preferable that the device further comprises a lock up control valve which introduces working fluid passing through the torque converter at a time of releasing the lock up clutch to the cooler without passing the fluid though the orifice. Conversely when the lock up clutch is fastened, the working fluid is introduced to the cooler from the upstream portion of the lock up control valve through the orifice by the lock up control valve.

The present invention provides a hydraulic pressure control device which comprises a toroidal continuously variable transmission having power rollers held between input discs and output discs and which transmits power to a torque converter having a lock up clutch connected to the continuously variable transmission, the device comprises a pressure regulator valve for adjusting the line pressure of working fluid supplied to the continuously variable transmission from a pump to a predetermined pressure, a pressure passage for introducing the adjusted line pressure to the lock up clutch through a lock up control valve and an oil cooler provided in a downstream portion of the lock up control valve. The working fluid passing through the cooler is supplied to a lubricating circuit of the continuously variable transmission.

The device further comprises a lock up regulator valve for adjusting to a pressure necessary for a lock up the valve being provided in the pressure passage, a lubricating fluid passage is connected to the drain end of the regulator valve, the lubricating fluid passage is connected to the pressure passage through an orifice, the lubricating circuit is separated into a first lubricating circuit for lubricating a bearing member of the power rollers and a second lubricating circuit for lubricating a rolling surface between the input and output discs and the power rollers, the first lubricating circuit is connected to a downstream portion of the cooler and the second lubricating circuit is connected to the lubricating fluid passage.

It is further preferable that the device comprises a lock up control valve which introduces working fluid passing through the torque converter when the lock up clutch is released to the cooler when the lock up clutch is fastened. The lock up control valve introduces the working fluid to the cooler from the lubricating fluid passage.

It is further preferable that the device comprises a check valve for preventing working fluid of the torque converter from escaping when the pump is stopped, the check valve being interposed between the second lubricating circuit and the lubricating fluid passage.

The details as well as other features and advantages of the present invention are set forth in the remainder of the specification and are shown in the accompanying drawings.

DESCRIPTION OF THE PREFERRED EMBODIMENTS

Figure 1:
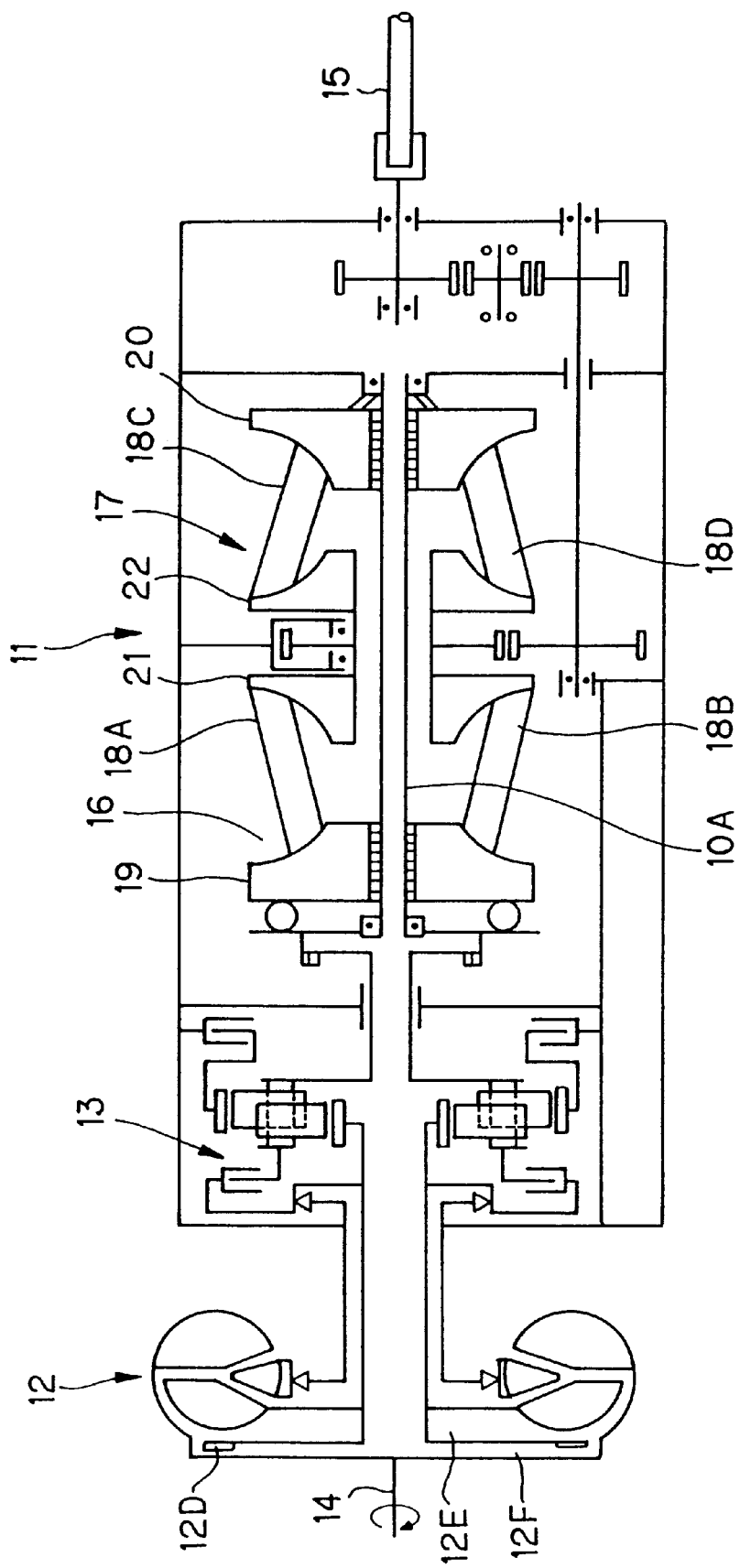
FIG. 1 is a schematic diagram of a transmission apparatus applying the invention.

With reference to FIG. 1, a transmission apparatus for a vehicle applying the invention comprises a torque converter 12 with a lock up clutch 12D, and a continuously variable transmission 11 with a forward/reverse change-over mechanism 13. A rotation of an engine (not shown) is input to an input shaft 14 of the torque converter 12, and an output shaft 15 of an automatic transmission 11 rotates a drive wheel through a propeller shaft. The continuously variable transmission 11 is constituted by a toroidal continuously variable transmission which is provided with a first toroidal transmitting portion 16 comprising an input disc 19 and an output disc 21 holding power rollers 18A and 18B therebetween, and a second toroidal transmitting portion 17 comprising an input disc 20 and an output disc 22 holding power rollers 18C and 18D therebetween.

The continuously variable transmission 11 realizes a desired speed change ratio by changing the angle of an incline of the power rollers 18A to 18D by fluid pressure. The toroidal continuously variable transmission of this type is known, for example, from U.S. Pat. No. 5,542,890.

Figure 2:
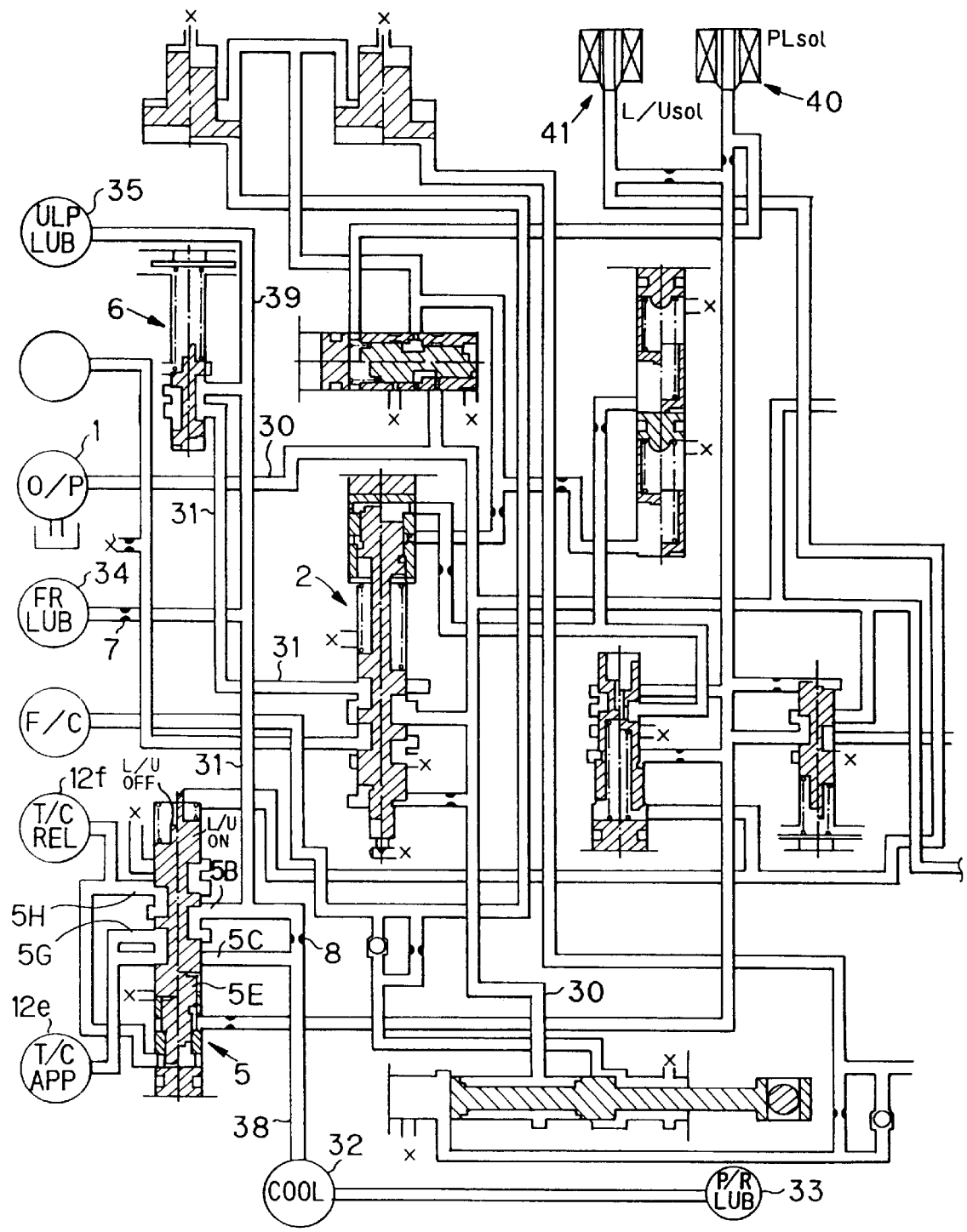
FIG. 2 is a circuit diagram which shows a fluid pressure circuit of an apparatus for controlling a fluid pressure in accordance with the invention.

The transmission apparatus mentioned above is controlled by a hydraulic pressure control device shown in FIG. 2.

In this hydraulic pressure control device, the discharge fluid of a hydraulic pump 1 driven by an engine is supplied to a line pressure circuit 30, and the pressure thereof is adjusted to a predetermined line pressure PL by a pressure control valve 2 provided in the line pressure circuit 30. The speed change ratio of the continuously variable transmission 11 is controlled by using the line pressure PL.

In this case, a signal pressure PLSOL from a line pressure solenoid valve 40 controlled in duty ratio by an electronic controller (not shown) is supplied to the pressure control valve 2, and the line pressure PL and pressure PT/C of a torque converter pressure circuit 31 are simultaneously controlled by a spool moving in accordance with the signal pressure PLSOL.

A relief valve 6 is connected to the torque converter pressure circuit 31, and pressure defined by the relief valve 6 is supplied to the lock up control valve 5.

The lock up control valve 5 is provided with a spool 5E driven in accordance with a signal pressure PL/USOL from a lock up solenoid valve 41 duty-controlled by an electronic controller. A port 5B connected to the pressure circuit 31 is connected to a port 5H or a 5G in accordance with the displacement of the spool 5E. Accordingly, the pressure PT/C of the port 5B is selectively supplied to a first fluid chamber 12E of the lock up clutch 12D through the port 5G, or a second fluid chamber 12F of the lock up clutch 12D through the port 5H. Therefore, the lock up clutch 12D is engaged or released.

Further, when the spool 5E displaces so that the port 5B is connected with the port 5H, that is, the lock up clutch 12D is released, the port 5G is connected with the port 5C. Accordingly, the working fluid flowing through the lock up clutch 12D is led from the port 5G to the port 5C.

The lubricating fluid passage 38 is connected to the torque converter pressure circuit 31 through the orifice 8, and the port 5B and the port 5C are respectively connected to an upstream portion and a downstream portion of the orifice 8. Accordingly, the orifice 8 is interposed in a passage bypassing the lock up control valve 5.

An oil cooler 32 for cooling lubricating fluid is disposed in the lubricating passage 38, and is connected to a first lubricating circuit 33 for supplying lubricating fluid to the bearing portion of the downstream power roller mentioned below.

Further, a lubricating fluid passage 39 is branched from the torque converter pressure circuit 31 disposed in an upstream side of the lock up control valve 5, and the lubricating fluid passage 39 is connected to a second lubricating circuit 35 for supplying lubricating fluid to a contact surface between the power roller and the disc mentioned below.

Figure 3:
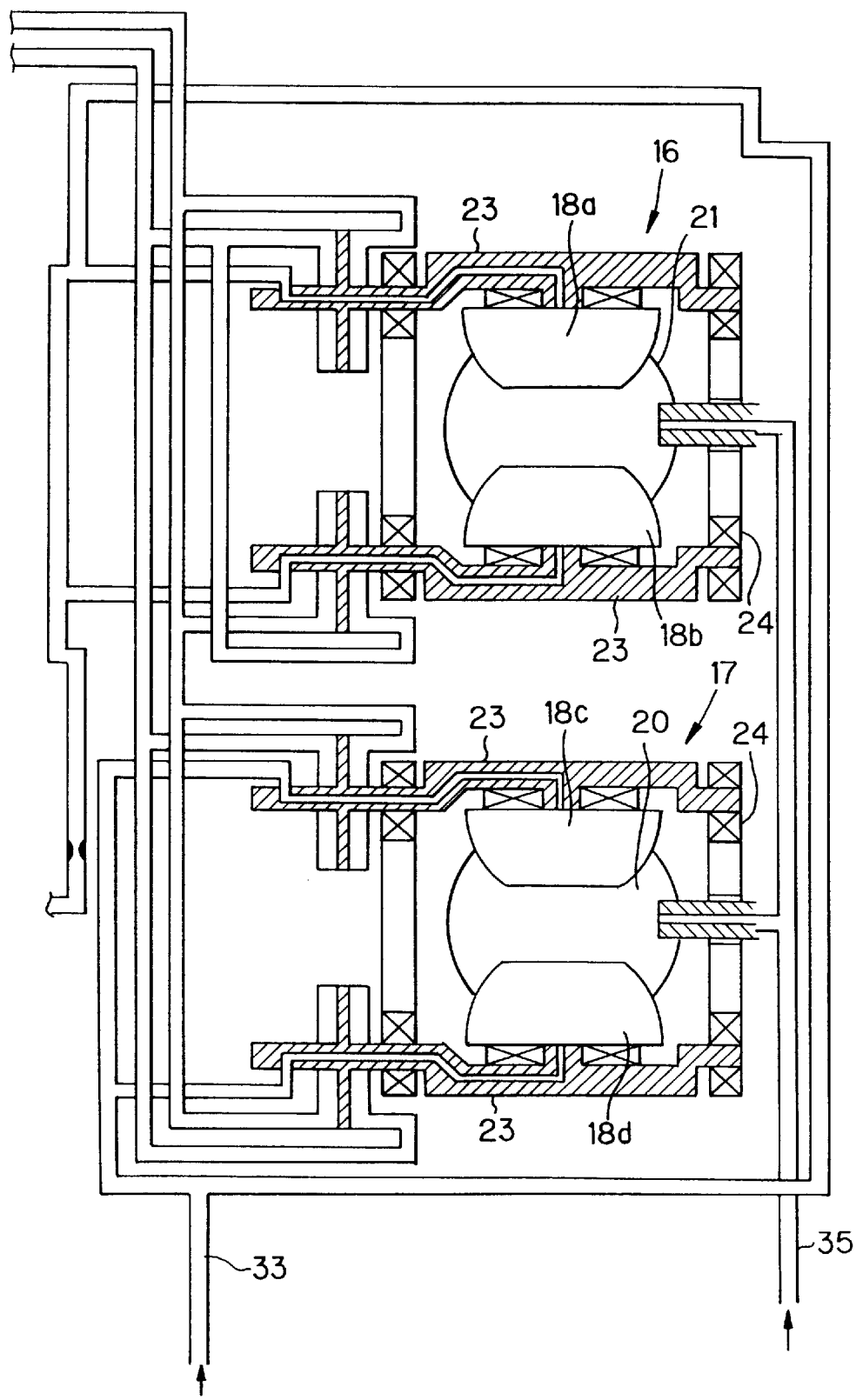
FIG. 3 is a circuit diagram which shows a fluid pressure circuit of a lubricating system in a continuously variable transmitting mechanism in accordance with the invention.

FIG. 3 shows a lubricating circuit of a continuously variable transmission, the first lubricating circuit 33 feeds lubricating fluid mainly to a power roller bearing portion by a fluid passage provided in such a manner as to extend an inner portion of a trunnion 23 for supporting power rollers 18A to 18D of the first and second toroidal speed change portions 16 and 17.

Further, the second lubricating circuit 35 injects lubricating fluid toward a contact surface between the power roller and discs 20 and 21 by a fluid passage provided in such a manner as to extend an inner portion of a pivot 24A of an upper link 24 mutually connecting the trunnions 23 of the power rollers 18A to 18D to each other, and performs lubrication and cooling thereof.

In this case, a required flow amount of the first lubricating circuit 33 is generally larger than a required flow amount of the second lubricating circuit 35.

Next, the operation of the invention will be described below.

The working fluid from the hydraulic pump 1 is adjusted a pressure in the pressure regulator valve 2, and is introduced to the torque converter pressure circuit 31 therefrom. The working fluid of the pressure circuit 31 is supplied to the lock up control valve 5 through the relief valve 6. At this time, when the spool 5E is shifted in response to the signal pressure PL/USOL from the lock up solenoid valve 41, the lock up clutch 12d is engaged (lock up ON) or released (lock up OFF).

The torque converter pressure PT/C is always supplied to the lubricating fluid passage 39 branching from the upstream portion of the relief valve 6 in the downstream portion of the pressure regulator 2.

Figure 4:
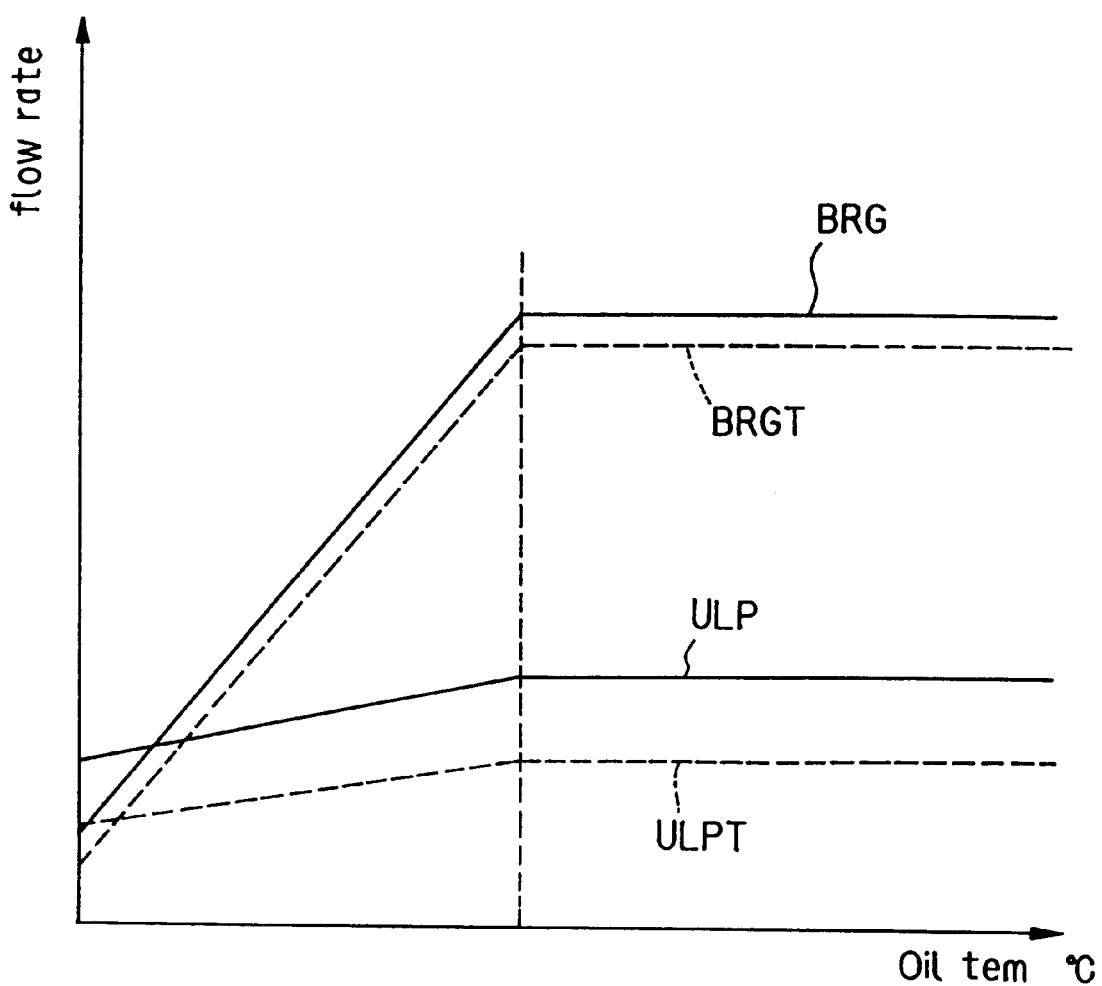
FIG. 4 is a graph which shows a ratio between a fluid temperature and a lubricating flow amount in accordance with the invention.

As shown in FIG. 4, when the fluid temperature is equal to or more than a predetermined value (for example, room temperature), a flow amount ULP which is slightly larger than a required flow amount ULPT (shown by a broken line in the drawing) is continuously supplied to the second lubricating circuit 35.

In this case, the required flow amount ULPT of the second lubricating circuit 35 is smaller than the required flow amount BRGT of the first lubricating circuit 33.

Accordingly, the second lubricating circuit 35 can lubricate the contact surface (the rolling surface) between the power rollers 18A to 18D and the input and output discs 19 to 22 by the working fluid having a relatively low temperature and not passing through the torque converter 12.

Since the pressurized fluid supplied to the second lubricating circuit 35 does not pass through the oil cooler 32, little pressure loss results. Therefore the necessary flow amount can be ensured to the power roller rolling surface, shown by a solid line (ULP) in FIG. 4, even when using a traction oil having a high viscosity as the working fluid. Accordingly, even when the fluid temperature is significantly low, lubricating performance can be secured and a slip of the rolling surface can be securely prevented.

On the other hand, the working fluid is supplied to the first lubricating circuit 33 connected to the downstream portion of the oil cooler 32 of the lubricating fluid passage 38.

Since the working fluid is supplied to an engaging fluid chamber 12E via the lock up control valve 5 from the upstream portion of the orifice 8 when lock up is in the ON position, the torque converter pressure PT/C necessary for lock up can be secured prior to the first lubricating circuit 33. In this case, a flow amount restricted by the orifice 8 flows in to the first lubricating circuit 33.

The working fluid passing to the engaging fluid chamber 12E from a releasing fluid chamber 12F through the torque converter 12 is led from the port 5C to the lubricating passage 38 when the lock up is in the OFF position, thereby joining in the flow amount from the orifice 8. However, they are supplied to the first lubricating circuit 33 after being cooled in the oil cooler 32.

Since only the first lubricating circuit 33 is connected to the lubricating fluid passage 38, the necessary flow amount is reduced. This is in contrast to the conventional embodiment in which all the fluid flow is for lubricating the power roller. As a result the lubricating fluid can be supplied in excess.

Accordingly, flow resistance due to the oil cooler 32 decreses preportional to the degree of reduction of the flow amount. Therefore, as shown by the solid line in FIG. 4, it is possible to ensure that, from extremely low to high temperatures, the amount of fluid flow actually supplied (shown by the soild line BRG) is greater than the required fluid flow to lubricate the power roller bearing member (shown by the broken line BRGT). Accordingly, even when fluid temperature is high and there is high load, lubrication of the power roller bearing member can be securely performed.

Further, even in the case that the temperature of the working fluid is increased by passing it through the torque converter 12, the working fluid is cooled by the oil cooler 32, so that the lubricating performance of the power roller bearing portion can be well maintained.

In this case, since the second lubricating circuit 35 having a relatively smaller necessary flow amount is branched from the upstream portion of the lock up control valve 5, the torque converter pressure PT/C is prevented from falling even when the lock up is in the ON position, so that the lock up clutch 12D can be securely fastened, thereby both improving the lubricating performance and securing the lock up performance.

Further, when the second lubricating circuit 35 is disposed in the upstream side of the lock up control valve 5, the high temperature working fluid heated by the torque converter 12 when the lock up is in the OFF position does not flow into the first lubricating circuit 35, so that the temperature of the power roller rolling surface is prevented from increasing and good lubricating performance can be secured.

Figure 5:
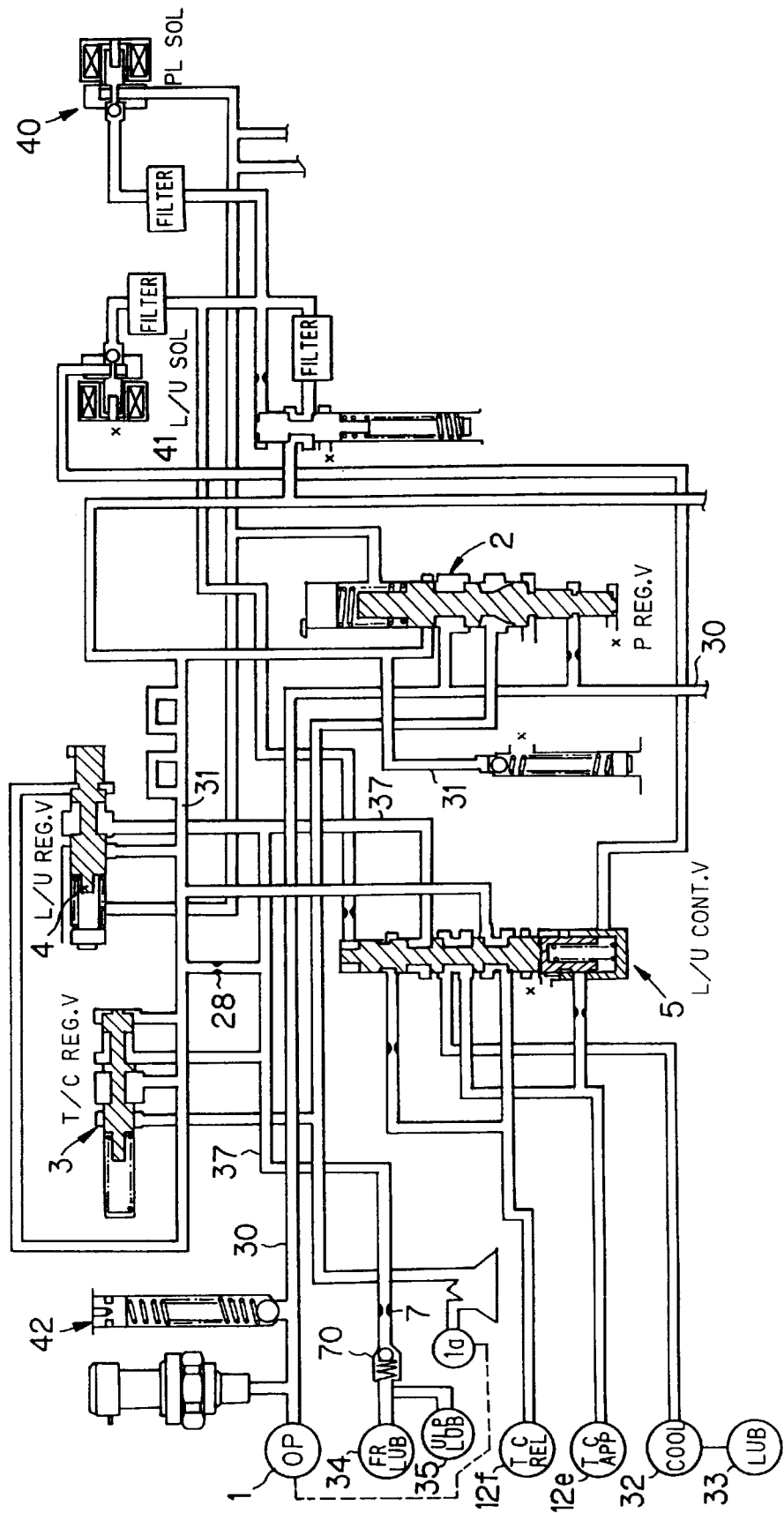
FIG. 5 is a circuit diagram of a fluid pressure similar to FIG. 2 which shows a second embodiment of the invention.

FIG. 5 shows a second embodiment of the invention.

The embodiment is structured such that the second lubricating circuit 35 is disposed in parallel to a front portion lubricating circuit 34 for lubricating a forward/reverse change-over mechanism 13.

A T/C regulator valve 3 for controlling the pressure PT/C in such a manner as not to exceed a pressure capable of being resisted by the torque converter 12 and a lock up regulator valve 4 for securing the PT/C necessary for the lock up prior to the flow amount to the lubricating fluid passage 37 are provided in the torque converter pressure circuit 31.

A first drain of the T/C regulator valve 3 is connected with the lubricating fluid passage 37, a second drain is connected with a suction port 1A of the hydraulic pump 1, and a drain of the lock up regulator valve 4 is connected with the lubricating fluid passage 37.

The torque converter pressure circuit 31 and the lubricating fluid passage 37 are connected with each other via the orifice 28 in addition to the drain mentioned above, thereby supplying at least the necessary flow amount to the lubricating fluid passage 37 via the orifice 28 even when the first drain of the T/C regulator valve 3 and the drain of the lock up regulator valve 4 are closed.

Then, an orifice 7 and a check valve 70 are interposed in the downstream portion of the lubricating fluid passage 37, and the front portion lubricating circuit 34 of the forward/reverse change-over mechanism 13 is connected to the downstream side thereof. A second lubricating circuit 35 is connected to the downstream portion of the check valve 70 through a lubricating fluid passage 39. Accordingly, the front portion lubricating circuit 34 and the second lubricating circuit 35 are mutually connected to each other in parallel.

Since the orifice 7 and the check valve 70 are present in the second lubricating circuit 35 and the lubricating circuit 37 disposed in the upstream portion of the front portion lubricating circuit 34, the check valve 70 is closed by a spring force when the engine is stopped, thereby preventing the working fluid of the engaging fluid chamber 12E and the releasing fluid chamber 12F of the torque converter 12 from flowing out into each of the lubricating circuits from the lubricating fluid passage 37, and also enabling a smooth speed change operation when starting the operation on a subsequent occasion.

Furthermore, a lubricating fluid passage 38 is connected to the downstream side of the lock up control valve 5 provided in the torque converter pressure circuit 31, an oil cooler 32 is interposed to the passage 38, and a first lubricating circuit 33 is connected to the downstream thereof.

As shown in the drawing, when the lock up is in the OFF position, in which the spool of the lock up control valve 5 is displaced upward, the torque converter pressure circuit 31 is connected to the releasing fluid chamber 12F, and the working fluid returned to the lock up control valve 5 through the engaging fluid chamber 12E from the releasing fluid chamber 12F is led to the lubricating fluid passage 38 and supplied to the first lubricating circuit 33 after being cooled by the oil cooler 32.

On the other hand when the lock up of the lock up control valve 5 is in the ON position, the spool is displaced to the lower portion in the drawing, the torque converter pressure circuit 31 is connected with the engaging fluid chamber 12E, and the releasing fluid chamber 12F is connected to the tank. The lubricating fluid passage 37 is connected with the lubricating fluid passage 38 via the lock up control valve 5.

The second lubricating circuit 35 connected to the downstream portion of the lubricating fluid passage 37 lubricates the rolling surface between the power rollers 18a to 18d and the input and output discs 19 to 22 by pressurized fluid continuously supplied from the torque converter pressure circuit 31 through the orifice 28 and pressurized fluid supplied from the torque converter pressure circuit 31 through the drain of the lock up regulator valve 4 or the first drain of the T/C regulator valve 3.

Accordingly, lubrication due to the second lubricating circuit 35 can lubricate the rolling surface between the power rollers 18a to 18d and the input and output discs 19 to 22 by the working fluid not passing through the torque converter 12, thereby securing a good lubricating performance.

Since the working fluid supplied to the lubricating fluid passage 37 does not pass through a circuit serving as a resistance, such as the oil cooler 32, a necessary amount supplied to the power roller rolling surface can be secured even when the fluid temperature is significantly low and the viscosity of the traction fluid is very high, such as when using a traction oil having a high viscosity as the working fluid. As a result, the lubricating performance can be well maintained.

Further, since the first lubricating circuit 33 for lubricating the bearing member of the power rollers 18A to 18D has no orifice in the lubricating fluid passage 38, a necessary flow amount can be easily secured regardless of the engaging state of the lock up clutch 12D. Even when high load causes a high fluid temperature, the lubricating flow amount to the power roller bearing member can be increased, so that the lubricating performance can be improved.

Still further, since the engaging capacity of the lock up clutch 12D is secured by the pressure PT/C set by the lock up regulator valve 4, a good lock up performance can be secured even when the line pressure PL corresponding to the fluid pressure of the line pressure circuit 30 is low.

The lubricating fluid passage 37 is connected with the torque converter pressure circuit 31 via the orifice 28 in addition to the first drain of the T/C regulator valve 3 and the drain of the lock up regulator valve 4. Accordingly, even when the T/C regulator valve 3 and the lock up regulator valve 4 are both closed as when the line pressure PL is low, at least the flow amount necessary for lubricating the front portion lubricating circuit 34 and the upper link pivot lubricating circuit 35 can be supplied from the orifice 28, so that the lubricating performance of the toroidal continuously variable transmission 11 can be secured.

As mentioned above, the lock up regulator valve 4 for securing the torque converter pressure PT/C necessary for the lock up prior to lubrication, and the T/C regulator valve 3 which controls the torque converter pressure PT/C so that it does not exceed a predetermined upper limit value are provided in the torque converter pressure circuit 31. The drain ends of the T/C regulator valve 3 and the lock up regulator valve 4 are connected to the lubricating fluid passage 37, and the torque converter pressure circuit 31 and the lubricating fluid passage 37 are connected with each other through the orifice 28, so that the front portion lubricating circuit 34 and the second lubricating circuit 35 are connected to the downstream portion of the lubricating fluid passage 37 in parallel, thereby securing the lubricating flow amount necessary for the rolling surface even at a super low fluid temperature and as a result improving lubricating performance.

Further, since the lock up control valve 5 is structured such as to directly connect the lubricating fluid passage 37 to the lubricating fluid passage 38 when the lock up is in the ON position, to connect the pressurized fluid passing through the engaging fluid chamber 12E from the releasing fluid chamber 12F to the lubricating fluid passage 38 at a time of the lock up OFF, and to lead to the power roller lubricating circuit 33 after being cooled by the cooler 32 of the lubricating fluid passage 38, and further since it is unnecessary to provide the orifice in the lubricating fluid passage 38 in this case, the flow amount to the first lubricating passage 33 is increased at a time of a high fluid temperature and a high load, so that the lubrication of the power roller bearing member can be securely performed. Further, the engaging capacity of the lock up clutch 12D is not deteriorated. Since the flow amount can be secured as mentioned above, the traction fluid having a high viscosity can be used, so that a durability of the toroidal continuously variable transmission 11 can be further improved by improving the lubricating performance thereby.

What is claimed is:

1. A hydraulic pressure control device for use with an automatic transmission which provides a toroidal continuously variable transmission having power rollers held between input discs and output discs and transmitting power, a torque converter having a lock up clutch connected to the continuously variable transmission comprising:

a pressure regulator valve for adjusting a line pressure of a working fluid supplied to said continuously variable transmission from a pump to a predetermined pressure;

a pressure passage for introducing the adjusted line pressure to said lock up clutch through a lock up control valve;

an oil cooler provided in a downstream portion of said lock up control valve; and said working fluid through said cooler being supplied to a lubricating circuit of the continuously variable transmission, wherein said lubricating circuit is separated into a first lubricating circuit for lubricating a bearing member of said power rollers and a second lubricating circuit for lubricating a rolling surface between said input and output discs and said power rollers, the first lubricating circuit is connected to a downstream portion of said cooler and said second lubricating circuit is connected to an upstream portion of said lock up control valve.

2. A hydraulic pressure control device according to claim 1, wherein an orifice is provided in a passage for flowing a working fluid by bypassing said lock up control valve, said cooler being connected to a downstream portion of said orifice.

3. A hydraulic pressure control device according to claim 2, wherein said lock up control valve introduces a working fluid passing through said torque converter at a time of releasing said lock up clutch to said cooler without passing though said orifice, and, at a time of fastening said lock up clutch, said working fluid is introduced to said cooler from the upstream portion of said lock up control valve through said orifice by said lock up control valve.

4. A hydraulic pressure control device according to claim 1, wherein said second lubricating circuit is connected to an upstream portion of said cooler.

* * * * *